United States Patent
Sharma et al.

(10) Patent No.: US 12,058,781 B2
(45) Date of Patent: *Aug. 6, 2024

(54) COMMUNICATIONS DEVICE, INFRASTRUCTURE EQUIPMENT, COMMUNICATIONS SYSTEM AND METHODS

(71) Applicant: Sony Group Corporation, Tokyo (JP)

(72) Inventors: Vivek Sharma, Basingstoke (GB); Hideji Wakabayashi, Basingstoke (GB); Shinichiro Tsuda, Basingstoke (GB); Shin Horng Wong, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,595

(22) Filed: May 5, 2023

(65) Prior Publication Data

US 2023/0276534 A1    Aug. 31, 2023

Related U.S. Application Data

(63) Continuation of application No. 17/526,653, filed on Nov. 15, 2021, now Pat. No. 11,665,775, which is a
(Continued)

(30) Foreign Application Priority Data

Aug. 1, 2017 (EP) .................................. 17184361

(51) Int. Cl.
H04W 80/02 (2009.01)
H04W 8/24 (2009.01)
(Continued)

(52) U.S. Cl.
CPC ............ *H04W 80/02* (2013.01); *H04W 8/245* (2013.01); *H04W 28/04* (2013.01); *H04W 76/27* (2018.02)

(58) Field of Classification Search
CPC ..... H04W 80/02; H04W 76/27; H04W 8/245; H04W 28/04; H04W 4/70; H04W 76/16;
(Continued)

(56) References Cited

U.S. PATENT DOCUMENTS 9,516,624 B2 * 12/2016 Schmidt ................ H04W 72/12
10,492,214 B2 * 11/2019 Heo ..................... H04W 72/046
(Continued)

FOREIGN PATENT DOCUMENTS

CN    105981431 A    9/2016
CN    107592653 A    1/2018
(Continued)

OTHER PUBLICATIONS

Aijaz, Adnan. "Packet duplication in dual connectivity enabled 5G wireless networks: Overview and challenges." IEEE Communications Standards Magazine 3.3 (2019): 20-28. (Year: 2019).*
(Continued)

*Primary Examiner* — Sharad Rampuria
(74) *Attorney, Agent, or Firm* — XSENSUS LLP

(57) ABSTRACT

A communications device is provided, which is configured to transmit or receive signals via a wireless access interface provided by the wireless communications network to or from one or more infrastructure equipment. The communications device is configured, at the time of a Radio Resource Control (RRC) connection establishment procedure, to receive a first message from one of the infrastructure equipment comprising an indication that the infrastructure equipment is capable of operating in accordance with a packet data convergence protocol (PDCP) in accordance with a first
(Continued)

radio access technology, to establish a PDCP entity based on the received indication, and to transmit a second message to the infrastructure equipment comprising an indication that the communications device is capable of operating in accordance with one or both of the PDCP in accordance with the first radio access technology and a PDCP in accordance with a second radio access technology.

20 Claims, 9 Drawing Sheets

Related U.S. Application Data continuation of application No. 16/634,166, filed as application No. PCT/EP2018/070897 on Aug. 1, 2018, now Pat. No. 11,178,724.

(51) Int. Cl.
*H04W 28/04* (2009.01)
*H04W 76/27* (2018.01)

(58) Field of Classification Search
CPC ..... H04W 92/02; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

| | | | | |
|---|---|---|---|---|
| 11,665,775 | B2* | 5/2023 | Sharma | H04W 28/04 370/329 |
| 2018/0279168 | A1* | 9/2018 | Jheng | H04L 5/001 |
| 2018/0367230 | A1* | 12/2018 | Su | H04W 72/1215 |
| 2019/0380164 | A1* | 12/2019 | Belghoul | H04W 28/0268 |
| 2020/0068437 | A1 | 2/2020 | Löhr et al. | |
| 2021/0006322 | A1 | 1/2021 | Agiwal et al. | |

FOREIGN PATENT DOCUMENTS

| | | |
|---|---|---|
| WO | 2014/022021 A1 | 2/2014 |
| WO | 2016/186697 A1 | 11/2016 |

OTHER PUBLICATIONS

Shreevastav, Ritesh, and Ricardo Simon Carbajo. "Dynamic RLC mode based upon link adaptation to reduce latency and improve throughput in cellular networks." 2016 IEEE 7th Annual Ubiquitous Computing, Electronics & Mobile Communication Conference (UEMCON). IEEE, 2016 (Year: 2016).*
NTT DOCOMO, Inc., "Further analysis of unified split bearer—UE procedure aspects", 3GPP TSG-RAN WG2 Meeting 98, Hangzhou, China, May 15-19, 2017, R2-1704343, 10.2.2, Discussion and decisions, pp. 1-4.
Ericsson, "On the different bearer options", 3GPP TSG-RAN WG2 #98 Hangzhou, China, May 15-19, 2017, R2-1704414, 10.2.2, Discussion, Decision, pp. 1-4.
ZTE Corporation, "Initial Stage 2 TP for EN-DC procedures", 3GPP TSG-RAN WG2 Meeting #98, Hangzhou, China, May 15-19, 2017, R2-1704659, 10.2.3, Discussion and Decision, pp. 1-17.
Ericsson, "Measurements and procedures for EN-DC", 3GPP TSG-RAN WG2 #98, Hangzhou, China, May 15-19, 2017, R2-1704702, 10.2.3, Discussion, Decision, pp. 1-7.
ZTE, CMCC, "Consideration on the bearer type harmonization", 3GPP TSG RAN WG2#NR_AdHoc#2, Qingdao, China, Jun. 27-29, 2017, R2-1706980, 10.2.2.1, Discussion and decision, pp. 1-36.
NEC, "NR PDCP for MCG bearer in EN-DC", 3GPP TSG-RAN WG2 #99, Berlin, Germany, Aug. 21-25, 2017, R2-1708225, 10.2.2.1 Bearer type harmonisation, Discussion and Decision, pp. 1-3.

Ericsson, "NR RRCConnectionReconfiguration procedure and signalling baseline", 3GPP TSG-RAN WG2 #NR2, Qingdao, P.R. of China, Jun. 27-29, 2017, R2-1707201, 10.4.1.3.3-NR—Stage-3—RRC—Connection reconfiguration, Discussion, Decision, pp. 1-11.
Samsung, "EN DC inter-node interaction, overview and RAN2/RAN3 scope", 3GPP TSG-RAN WG2 Meeting #98, Hangzhou, China, May 15-19, 2017, R2-1705345, 10.2.3, Discussion and decision, pp. 1-6.
Mediatek Inc., "On capability for different bearer configuration in EN-DC", 3GPP TSG-RAN WG2 Meeting #98, HangZhou, China, May 15-19, 2017, R2-1704714, 10.2.6, Discussion and Decision, pp. 1-2.
ETSI MCC, "Report of 3GPP TSG RAN WG2 NR AdHoc#2 meeting, Qingdao, China", 3GPP TSG-RAN WG2 meeting #99, Berlin, Germany, Aug. 21-25, 2017, R2-1707602, 2.2, Approval, pp. 1-106.
Intel Corporation, "RRC aspects of unifying split bearer types", 3GPP TSG-RAN WG2 Meeting Ad hoc, Qingdao, China, Jun. 27-29, 2017, R2-1707037, 10.2.2.1, Discussion and Decision, pp. 1-5.
Sharp, "PDCP type for EN-DC supported environment", 3GPP TSG-RAN WG2 NR Ad Hoc 2, Qingdao, China, Jun. 27-29, 2017, R2-1706568, 10.2.2.1, Discussion and Decision, pp. 1-2.
NTT DOCOMO, Inc., "MCG/SCG configuration for LTE-NR Dual Connectivity", 3GPP TSG-RAN WG2 NR Ad-hoc #2, Jun. 27-29, 2017, Qingdao, China, R2-1706748, Revision of R2-1704192, 10.4.1.3.3 Connection reconfiguration, Discussion and decision, pp. 1-8.
Ericsson, "RRC procedure and signalling for harmonised bearers", 3GPP TSG-RAN WG2 NR#2, Qingdao, China, Jun. 27-29, 2017, R2-1706571, 10.2.2.1, Discussion, Decision, pp. 1-7.
Ericsson, "Bearer type switching in dual connectivity", 3GPP TSG-RAN WG2 NR#2, Qingdao, China, Jun. 27-29, 2017, R2-1706572, 10.2.2.2, Discussion, Decision, pp. 1-6.
Huawei, Hisilicon, "Design for harmonized bearer type", 3GPP TSG RAN WG2 Meeting Ad hoc, Qingdao, China, Jun. 27-29, 2017, R2 1707402, 10.2.2.1, Discussion and Decision, pp. 1-4.
Samsung, "Unifying Bearer Types and Related Issues", 3GPP TSG-RAN WG2 Ad-hoc NR#2, Qingdao, China, Jun. 27-29, 2017, R2-1707376, 10.2.2.1, Discussion & Decision, pp. 1-2.
International Search Report and Written Opinion mailed on Sep. 13, 2018 for PCT/EP2018/070897 filed on Aug. 1, 2018, 11 pages.
3GPP, "LTE; Evolved Universal Terrestrial Radio Access (E-UTRA); Packet Data Convergence Protocol (PDCP) specification," 3GPP TS 36.323 version 14.3.0 Release 14, ETSI TS 136 323 V14.3.0, Jul. 2017, pp. 1-45.
4G Americas, "LTE Aggregation & Unlicensed Spectrum," The Voice of 5G for the Americas, Nov. 2015, pp. 1-25.
Holma, H., and Toskala, A., "LTE for UMTS: OFDMA and SC-FDMA Based Radio Access," System Architecture Based on 3GPP SAE, John Wiley & Sons Ltd., Mar. 2009, pp. 25-27.
NTEL Corporation (Rapporteur), "Offline discussion No. 3 on harmonized bearer type," 3GPP TSG-RAN WG2 Meeting Ad hoc, draft-R2-1707487, Qingdao, China, Jun. 27-29, 2017, 8 pages.
NTT DOCOMO, "New SID Proposal: Study on New Radio Access Technology," 3GPP TSG RAN Meeting No. 71, RP-160671, Goteborg, Sweden, Mar. 7-10, 2016, 8 pages.
Qualcomm Incorporated, "Co-existence of LWA/LWIP with legacy operator WLAN." 3GPP TSG-RAN2 Meeting No. 93bis, R2-162905, Dubrovnik, Croatia, Apr. 12-16, 2016, 2 pages.
Marsch, Patrick, et al. "5G radio access network architecture: Design guidelines and key considerations." IEEE Communications Magazine 54.11 (2016): 24-32. (Year: 2016).
Preface 5g Americas et al: Table of Contents, Nov. 1, 2015 (Nov. 1, 2015), XP055504011, Retrieved from the Internet:URL:http://www.5gamericas.org/files/1214/4648/2397/4G_Americas_LTE_AggregationUnlicensed_Spectrum_White_Paper_November_2015.pdf.
Qualcomm Incorporated: "Coexistence of LWA/LWIP with legacy operator WLAN", 3GPP Draft; R2-162905 LWA LWIP Coexistence, 3rd Generation Partnership Project {3GPP}, Mobile Com-

(56) References Cited

OTHER PUBLICATIONS petence Centre; 650, Route Des Lucioles : F-06921 Sophia—D2 Antipolis Cedex; France, vol. RAN WG2, No. Dubrovnik, Croatia, Apr. 12-16, 2016.

Iwamura, Mikio, et al. "Carrier aggregation framework in 3GPP LTE-advanced [WiMAX/LTE Update]." IEEE Communications magazine 48.8 (2010): 60-67. (Year: 2010).

* cited by examiner

```
SRB-ToAddMod ::= SEQUENCE {
    srb-Identity              INTEGER (1..2),
    rlc-Config                CHOICE {
        explicitValue             RLC-Config,
        defaultValue              NULL
    }                                                     OPTIONAL,  -- Cond Setup
    logicalChannelConfig      CHOICE {
        explicitValue             LogicalChannelConfig,
        defaultValue              NULL
    }                                                     OPTIONAL,  -- Cond Setup
    ...,
    nr-Pdcp-Config            ENUMERATED {enabled}
}
```

FIG. 5

```
RRCConnectionSetupComplete-v1320-IEs ::= SEQUENCE {
    ce-ModeB-r13                  ENUMERATED {supported}     OPTIONAL,
    s-TMSI-r13                    S-TMSI                     OPTIONAL,
    attachWithoutPDN-Connectivity-r13  ENUMERATED {true}     OPTIONAL,
    up-CIoT-EPS-Optimisation-r13  ENUMERATED {true}          OPTIONAL,
    cp-CIoT-EPS-Optimisation-r13  ENUMERATED {true}          OPTIONAL,
    nonCriticalExtension          RRCConnectionSetupComplete-vxy-IEs  OPTIONAL
}

RRCConnectionSetupComplete-vxy-IEs ::= SEQUENCE {
    pdcp-State             ENUMERATED {LTE, NR}    OPTIONAL,
    nonCriticalExtension   RRCConnectionSetupComplete-vxy-IEs  OPTIONAL
}
```

FIG. 6

COMMUNICATIONS DEVICE, INFRASTRUCTURE EQUIPMENT, COMMUNICATIONS SYSTEM AND METHODS

CROSS-REFERENCE TO RELATED APPLICATIONS

This application is a continuation of U.S. application Ser. No. 17/526,653, filed Nov. 15, 2021, which is a continuation of U.S. application Ser. No. 16/634,166, filed Jan. 27, 2020 (now U.S. Pat. No. 11,178,724), which is based on PCT filing PCT/EP2018/070897, filed Aug. 1, 2018, and claims priority to 17184361.8, filed in the European Patent Office on Aug. 1, 2017, the entire contents of each of which are being incorporated herein by reference.

BACKGROUND

Field of Disclosure

The present disclosure relates to communications devices configured to communicate with infrastructure equipment of wireless communications networks, where the communications devices may be able to operate in accordance with one or both of a Packet Data Convergence Protocol (PDCP) in accordance with a first radio access technology and a PDCP in accordance with a second radio access technology.

The present application claims the Paris Convention priority of European patent application EP17184361.8, the contents of which are hereby incorporated by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the Third Generation Project Partnership (3GPP) defined Universal Mobile Telecommunications Standard (UMTS) and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficiently connectivity for a wide range of devices associated with different applications with different characteristic data traffic profiles, resulting in different devices having different operating characteristics and/or requirements.

The introduction of new radio access technology (RAT) systems/networks therefore gives rise to new opportunities as well as challenges. One such challenge is how to adapt presently used protocols and procedures such that they can work with both legacy (i.e. LTE) devices and NR devices. An example of this would be a Packet Data Convergence Protocol (PDCP), which is different for NR than for LTE; an LTE UE will not be able to use NR-PDCP.

SUMMARY OF THE DISCLOSURE

The present disclosure can help address or mitigate at least some of the issues discussed above.

Embodiments of the present technique can provide a communications device configured to transmit or receive signals via a wireless access interface provided by the wireless communications network to or from one or more infrastructure equipment forming part of the wireless communications network, wherein the communications device is configured, during of a Radio Resource Control, RRC, connection establishment procedure, to receive a first message from one of the infrastructure equipment comprising an indication that the infrastructure equipment is capable of operating in accordance with a packet data convergence protocol, PDCP, in accordance with a first radio access technology, to establish a PDCP entity based on the indication received in the first message, and subsequently to transmit a second message to the infrastructure equipment comprising an indication that the communications device is capable of operating in accordance with one or both of the PDCP in accordance with the first radio access technology and a PDCP in accordance with a second radio access technology.

Embodiments of the present technique, which further relate to infrastructure equipment, communications systems, methods of operating communications devices, infrastructure equipment and communications systems, and circuitry for communications devices, infrastructure equipment and communications systems, allow for the configuration of NR-PDCP for master cell group (MCG) signalling radio bearers (SRBs) when the MCG is LTE, where the communications devices may be either NR devices supporting LTE-NR dual connectivity or legacy devices.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 5 illustrates the changes required in MSG4 of a RACH procedure in consideration of some embodiments of the present technique;

FIG. 6 illustrates the changes required in MSG5 of a RACH procedure in consideration of some embodiments of the present technique;

DETAILED DESCRIPTION OF THE EMBODIMENTS

New Radio Access Technology (5G)

As mentioned above, the embodiments of the present invention can find application with advanced wireless communications systems such as those referred to as 5G or New Radio (NR) Access Technology. It has been proposed to develop a new Radio Access Technology (RAT) for the next generation wireless communication system, i.e. 5G, and in 3GPP a Study Item (SI) on NR has been agreed [1] in order to study and develop the new RAT. The new RAT is expected to operate in a large range of frequencies, from hundreds of MHz to 100 GHz and it is expected to cover a broad range of use cases. The use cases that are considered under this SI include:
Enhanced Mobile Broadband (eMBB)
Massive Machine Type Communications (mMTC)
Ultra Reliable & Low Latency Communications (URLLC)

Figure 1:
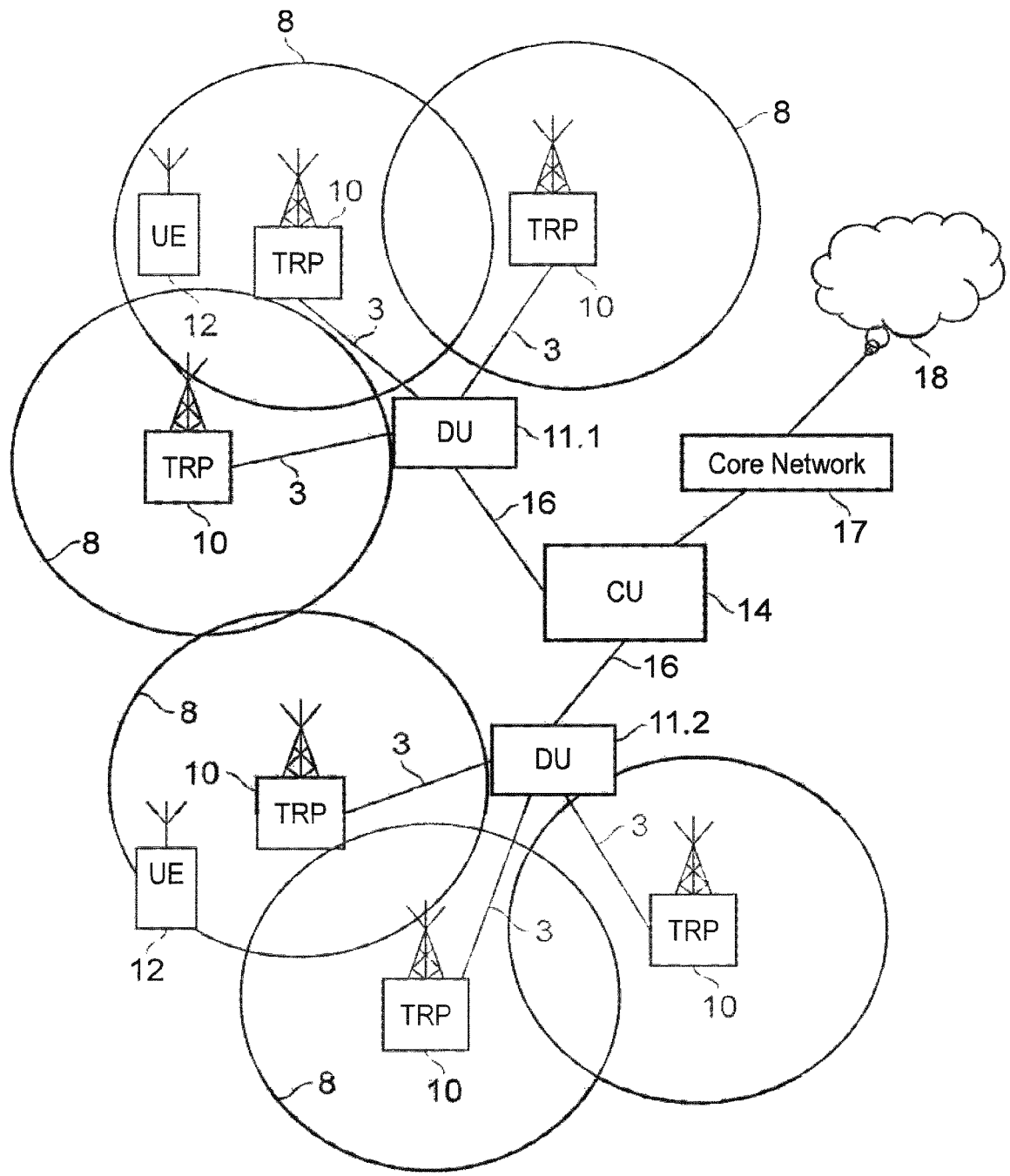
FIG. 1 is a schematic block diagram of a wireless communications system with architectural components corresponding to that of an example enhanced new radio or 5G network.

The aim of 5G is not only mobile connectivity for people, but to provide ubiquitous connectivity for any type of device and any type of application that would benefit from being connected. Many requirements and use-cases are still being discussed, but amongst those are:
Low latency
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars)
Low device cost and energy consumption
Flexible spectrum usage
Flexible mobility An example configuration of a wireless communications network which uses some of the terminology proposed for NR and 5G is shown in FIG. 1. In FIG. 1 a plurality of transmission and reception points (TRP) 10 are connected to distributed control units (DU) 11.1, 11.2 by a connection interface represented as a line 3. Each of the transmitter receiver points (TRP) 10 is arranged to transmit and receive signals via a wireless access interface within a radio frequency bandwidth available to the wireless communications network. Thus within a range for performing radio communications via the wireless access interface, each of the TRP 10, forms a cell of the wireless communications network as represented by a dashed line 8. As such wireless communications devices 12 which are within a radio communications range provided by the cells 10 can transmit and receive signals to and from the TRP 10 via the wireless access interface. Each of the distributed control units 11.1, 11.2 are connected to a coordinating unit (CU) 14 via an interface 16. The CU 14 is then connected to the a core network 17 which may contain all other functions required for communicating data to and from the wireless communications devices and the core network 17 may be connected to other networks 18.

The elements of the wireless access network shown in FIG. 1 may operate in a similar way to corresponding elements of an LTE network well-known and defined in the relevant standards administered by the 3GPP® body, and also described in many books on the subject, for example, Holma H. and Toskala A [2]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The transceiver processors TRP 10 of FIG. 1 may in part have a corresponding functionality to a base station or eNodeB of an LTE network, and so the terms TRP and eNodeB in the following description are interchangeable. Base stations, which are an example of radio network infrastructure equipment, may also be referred to as transceiver stations/NodeBs/eNodeBs (eNBs)/gNodeBs (gNBs), and so forth. Similarly the communications devices 12 may have a functionality corresponding to devices know for with an LTE network and may also be referred to as mobile stations, user equipment (UE), user terminal, terminal device, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

At least for initial deployment, NR and LTE are expected to coexist. In NR, there are in general two operational modes. These are a tight interworking mode and standalone mode. In tight interworking mode, an NR eNodeB works together with an LTE eNodeB. This may occur using an approach similar to, for example, dual connectivity (as known in LTE), and may include, for example, the LTE eNodeB working as an anchor eNodeB for the 5G NR eNodeB. On the other hand, in standalone mode, an NR eNodeB could work independently without the assistance of an LTE eNodeB. The Packet Data Convergence Protocol (PDCP) operates differently in NR and LTE, and so for LTE-NR dual connectivity deployments, when UEs may capable of operating in accordance with either NR or LTE, it is necessary to determine what capability the UEs have, and therefore whether to use NR-PDCP or LTE-PDCP at a time of Radio Resource Control (RRC) connection establishment.

PDCP Entities for MCG Bearer

Some appreciation of the packet data convergence protocol (PDCP) can be garnered from many sources, such as [3]. The PDCP layer runs on top of the radio resource control (RLC) layer, and the Medium Access Control (MAC) layer. A PDCP is used to perform the PDCP functions, and this can be configured either with both a transmitting and a receiving side (for a bidirectional radio bearer), or only one of a transmitting and a receiving side (for a unidirectional radio bearer). Radio bearers utilizing PDCP entities can be categorized into Signalling Radio Bearer (SRB) and Data Radio Bearers (DRBs), where the DRBs can be either, RLC Acknowledged Mode (AM), which includes Automatic Repeat Request (ARQ) for error-free packet delivery or RLC Unacknowledged Mode (UM), where retransmission is not necessary. The PDCP control unit manages control information generated by the PDCP entity. Two kinds of control information are defined: PDCP status report and Robust Header Compression (ROHC) feedback. The PDCP entity performs header compression, security functions, handover support functions, maintenance of PDCP sequence numbers for SRB and DRB and timer-based SDU discard for SRB and DRB.

Figure 2:
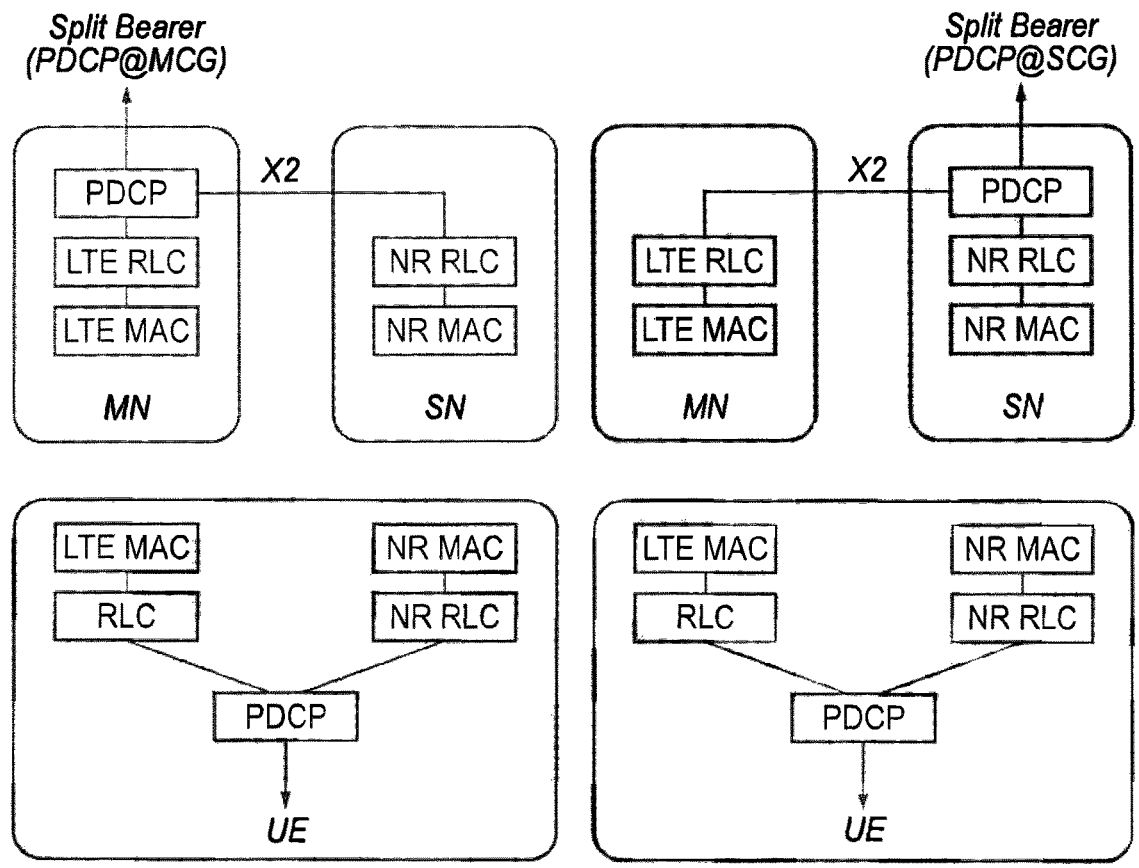
FIG. 2 is a schematic block diagram showing a UE and network supporting dual connectivity and having an LTE-PDCP entity or an NR-PDCP entity.

There was a discussion during a 3GPP meeting documented in [4] on which PDCP entity should be configured for master cell group (MCG)-SRBs. It was already agreed that the UE and the network will use NR-PDCP for MCG split bearers, secondary cell group (SCG) bearers and SCG split bearers if the UE/network support dual connectivity between LTE and NR. If the UE uses NR-PDCP for MCG-SRBs as well, then there is no need to maintain two PDCP entity types (i.e. both LTE-PDCP and NR-PDCP) in the UE and network for the UE and network supporting dual connectivity, as shown in FIG. 2. It is possible to use NR-PDCP for DRBs anchored in the LTE MCG, as also shown in FIG. 2.

In [4], it was agreed that the PDCP configuration should be included within the NR RRC PDU from the secondary node to allow direct SCG SRB reconfiguration of PDCP, and that it was assumed that the SRB or DRB ID is used from the linking. It was also agreed that either LTE or NR PDCP could be used, and that this would be configurable by the network. No clear consensus was reached however, and no concrete solutions were proposed. The following points in [4], labelled as those for further study, are addressed by embodiments of the present technique:

Which PDCP should be used for MCG SRB at the time of connection setup? What mechanism is used (if needed) to indicate to the network whether or not the UE supports NR-PDCP during connection setup?

Whether to support a mechanism to reconfigure from LTE-PDCP to NR-PDCP without handover, and if so, what would this mechanism look like?

If the first and second of the above points are resolved, and NR-PDCP is always configured for MCG SRB, then reconfiguration without handover may not be needed. To start with, it is good to know the difference between LTE-PDCP and NR-PDCP for the configuration of SRB1, which is that LTE uses PDCP sequence number (SN) based reception mechanism, whereas NR-PDCP will use COUNT instead of PDCP SN. COUNT comprises PDCP SN, so from a functional point of view, NR-PDCP also takes the Hyper Frame Number (HFN) value, which is a number which is incremented each time the PDCP SN wraps around, into account in addition to the PDCP SN. This is the main difference between LTE PDCP and NR-PDCP in the context of SRB1.

LTE SRB handling, and the assumed NR SRB handling is described below, with some wording being taken from the 3GPP Technical Specification 36.323 [3]:

For SRBs, at reception of a PDCP Data PDU from lower layers, the UE shall:

If received PDCP SN<Next_PDCP_RX_SN:
    decipher and verify the integrity of the PDU (if applicable) using COUNT based on RX_HFN+1 and the received PDCP SN as specified in the subclauses 5.6 and 5.7, respectively;

else:
    decipher and verify the integrity of the PDU (if applicable) using COUNT based on RX_HFN and the received PDCP SN as specified in the subclauses 5.6 and 5.7, respectively;

if integrity verification is applicable and the integrity verification is passed successfully; or if integrity verification is not applicable:
    if received PDCP SN<Next_PDCP_RX_SN:
        increment RX_HFN by one;
    set Next_PDCP_RX_SN to the received PDCP SN+1;
    Next_PDCP_RX_SN>Maximum_PDCP_SN:
        set Next_PDCP_RX_SN to 0;
        increment RX_HFN by one;
    deliver the resulting PDCP SDU to upper layer;

else, if integrity verification is applicable and the integrity verification fails:
    discard the received PDCP Data PDU;
    indicate the integrity verification failure to upper layer.

At reception of a PDCP Data PDU from lower layers, the receiving PDCP entity shall determine the COUNT value of the received PDCP PDU, i.e. RCVD_COUNT, as follows:

if RCVD_SN<=SN(RX_DELIV)−Window_Size:
    RCVD_HFN=HFN(RX_DELIV)+1;
else if RCVD_SN>SN(RX_DELIV)+Window_Size:

RCVD_HFN=HFN(RX_DELIV)−1;
else:
RCVD_HFN=HFN(RX_DELIV);
RCVD_COUNT=[RCVD_HFN, RCVD_SN].
After determining the COUNT value of the received PDCP PDU=RCVD_COUNT, the receiving PDCP entity shall:
if RCVD_COUNT<=RX_DELIV; or
if the PDCP PDU with COUNT=RCVD_COUNT has been received before:
perform deciphering and integrity verification of the PDCP PDU using COUNT=RCVD_COUNT, if applicable;
if integrity verification fails:
indicate the integrity verification failure to upper layer;
discard the PDCP PDU;
else:
perform deciphering and integrity verification of the PDCP PDU using COUNT=RCVD_COUNT, if applicable;
if integrity verification fails:
indicate the integrity verification failure to upper layer;
discard the PDCP PDU;
If the received PDCP PDU with COUNT value=RCVD_COUNT is not discarded above, the receiving PDCP entity shall:
store the resulting PDCP SDU in the reception buffer;
if RCVD_COUNT>=RX NEXT:
update RX_NEXT to RCVD_COUNT+1;
if RCVD_COUNT=RX_DELIV+1:
deliver to upper layers in ascending order of the associated COUNT value after performing header decompression, if configured;
all stored PDCP SDU(s) with consecutively associated COUNT value(s) starting COUNT=RX_DELIV+1;
update RX_DELIV to the COUNT value of the last PDCP SDU delivered to upper layers;
if t-Reordering is running, and if the PDCP SDU with COUNT=RX_REORD−1 has been delivered to upper layers:
stop and reset t-Reordering;
if t-Reordering is not running (includes the case when t-Reordering is stopped due to actions above), and if there is at least one stored PDCP SDU:
update RX_REORD to RX_NEXT;
start t-Reordering.

Some other differences between LTE and NR-PDCP are described below. The intention is to establish what different handling is required if NR-PDCP is used instead of LTE-PDCP, and at what stage the network and UE must start using NR-PDCP, if NR-PDCP is selected for SRB:

Packet duplication when a split SRB is configured. Most likely, a split SRB is not configured in MSG4 (of a RACH procedure) even if the bearer is offloaded during initial context setup. The assumption is that a split SRB is configured at the same time as the bearer is offloaded. However, there is a possibility that MSG4 configures a split SRB, because bearer offloading will also be done blindly. So, split SRB1 configuration can be provided in MSG4, if security is not a concern. If security is concern however, then this won't happen before the first reconfiguration message;

Jumbo frames—a size of 9 KB may be applicable to SRB1. However, though the RRC message size may not be this big initially, this is something which may happen in the future;

Pre-processing—this is not applicable to SRB1, as SRB data needs to be transmitted with a high priority;

LTE-PDCP RLC-UM uses a PULL window whereas NR-PDCP RLC-UM will use a PUSH window for all. However, RLC-UM is not used for SRB.

It is necessary to determine at what stage the network configures a UE to use NR-PDCP for MCG-SRB. It may be the case that either the UE or network, or both the UE and the network, do not support MCG SRB on NR-PDCP. In such a case, unnecessary switching between LTE-PDCP and NR-PDCP should be avoided. Embodiments of the present technique seek to resolve this problem.

Configuration of NR-PDCP for MCG SRB1

No PDCP entity is used for the transmission/reception of MSG1, 2, 3 and 4. The earliest possibility at which a UE can be configured to use NR-PDCP is during MSG4 (transmitted on the downlink) UE capability information is needed before MSG4, and there has already been a proposal in [4] for MSG3 to include UE NR-PDCP capability. One drawback of using MSG3 for this purpose is that there is only one spare bit left in MSG3, and so MSG3 should not be used for this purpose if an alternative solution is found.

Figure 3:
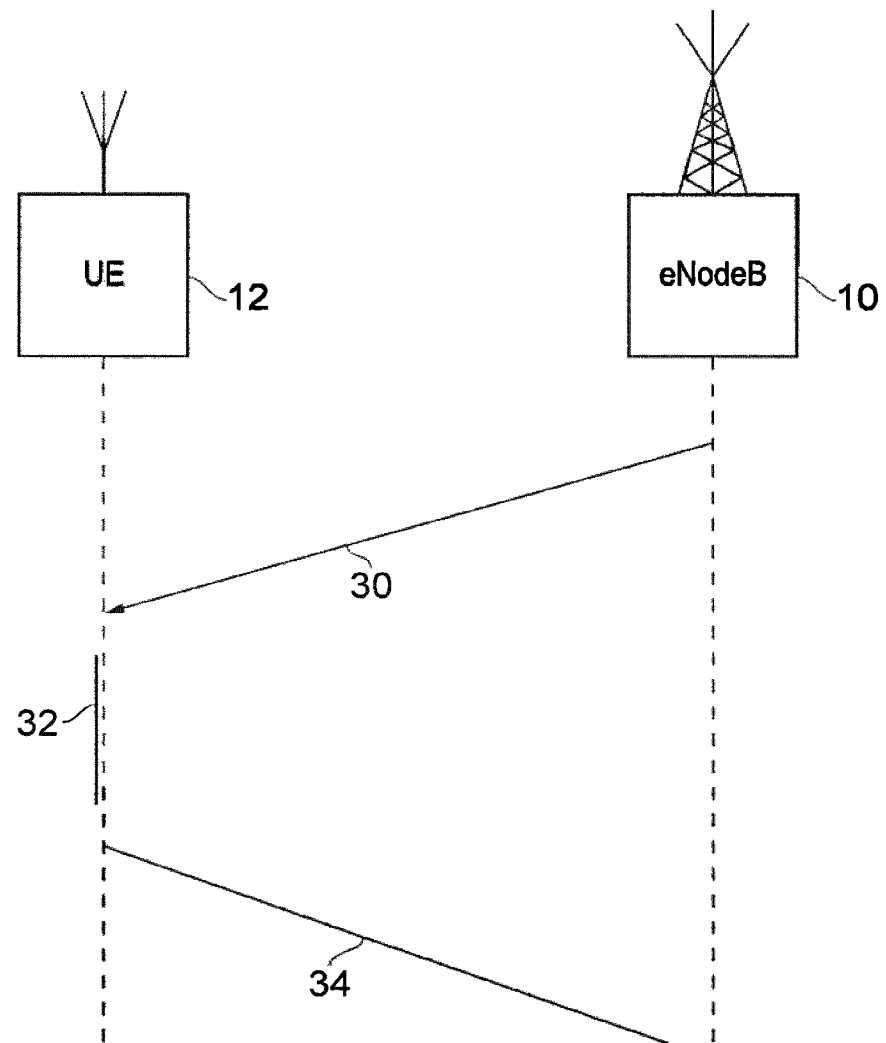
FIG. 3 is a first example of a message flow diagram showing a message exchange between a communications device and an infrastructure equipment in accordance with embodiments of the present technique.

FIG. 3 illustrates one such solution. FIG. 3 is a message flow diagram showing a message exchange between a communications device 12 and an infrastructure equipment 10 in accordance with embodiments of the present technique. The communications device 12 is configured to transmit or receive signals via a wireless access interface provided by a wireless communications network to or from one or more infrastructure equipment 10 forming part of the wireless communications network, wherein the communications device 12 is configured, at the time of a Radio Resource Control, RRC, connection establishment procedure, to receive 30 a first message from one of the infrastructure equipment 10 comprising an indication that the infrastructure equipment 10 is capable of operating in accordance with a packet data convergence protocol, PDCP, in accordance with a first radio access technology, to establish 32 a PDCP entity based on the indication received in the first message, and subsequently to transmit 34 a second message to the infrastructure equipment 10 comprising an indication that the communications device 12 is capable of operating in accordance with one or both of the PDCP in accordance with the first radio access technology and a PDCP in accordance with a second radio access technology.

In some embodiments, the second message is transmitted by the communications device using the PDCP entity that it established based on the indication received in the first message.

Figure 4:
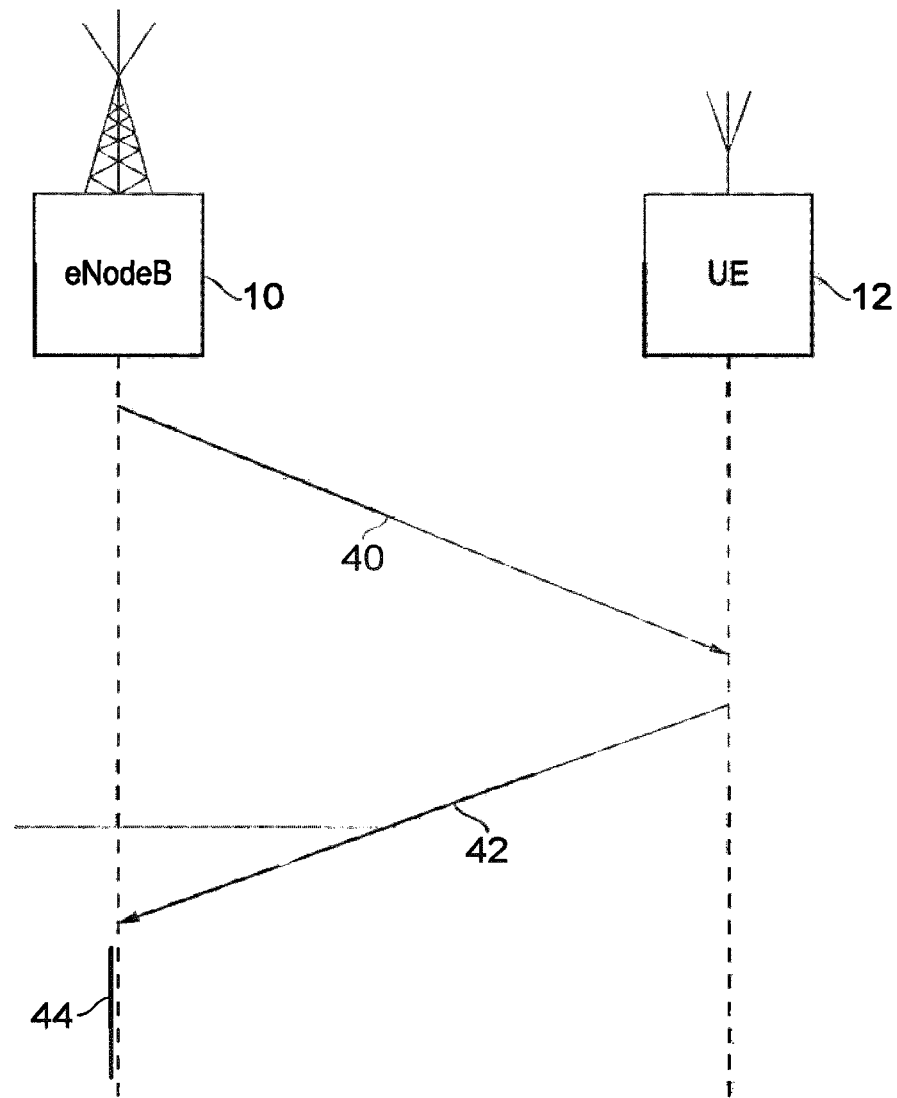
FIG. 4 is a second example of a message flow diagram showing a message exchange between a communications device and an infrastructure equipment in accordance with embodiments of the present technique.

FIG. 4 is a message flow diagram showing a message exchange between a communications device 12 and an infrastructure equipment 10 in accordance with embodiments of the present technique. FIG. 4 is substantially equivalent to FIG. 3, but demonstrates the process from the viewpoint of the network. The infrastructure equipment 10, which forms part of the wireless communications network, is configured to transmit or receive signals via a wireless access interface provided by the wireless communications network to or from one or more communications devices 12, wherein the infrastructure equipment 10 is configured, at the time of a Radio Resource Control, RRC, connection establishment procedure, to transmit 40 a first message to one of the communications devices 12 comprising an indication that the infrastructure equipment 10 is capable of operating in accordance with a packet data convergence protocol, PDCP, in accordance with a first radio access technology, to receive 42 a second message from the communications device 12 comprising an indication that the communications device 12 is capable of operating in accordance with one or both of the PDCP in accordance with the first radio access technology and a PDCP in accordance with a second radio access technology, and to select 44 the PDCP in accordance with the first radio access technology for future communications with the communications device 12 if the communications device 12 is capable of operating in accordance with the PDCP in accordance with the first radio access technology, or else to select the PDCP in accordance with the second radio access technology for future communications with the communications device 12.

In some embodiments relating to FIGS. 3 and 4, the first message forms part of a random access procedure between the communications device and the infrastructure equipment. In some embodiments relating to FIGS. 3 and 4, the first radio access technology is New Radio (NR), and/or the second radio access technology is Long Term Evolution (LTE).

Such solutions as illustrated in FIGS. 3 and 4 constitute blind activation without the network knowing the UE's capability of NR-PDCP in MSG4. If the UE does not understand the Non Critical Extension in Abstract Syntax Notation 1 (ASN.1), then it will continue using LTE-PDCP in MSG5. Example changes to MSG4 are shown in FIG. 5 (the text written in darker font), whereby a new "SRB to Add" information element (IE) is included (RadioResourceConfigDedicated). Legacy UEs will ignore this IE, and UEs capable of E-UTRA-NR Dual Connectivity (EN-DC) will configure NR-PDCP for SRB1.

Alternatively to transmitting it in the first message as defined by FIGS. 3 and 4, the network's capability to support NR-PDCP may be broadcast. Therefore, in some embodiments, the first message is received from the infrastructure equipment as a broadcast. In general, the broadcast of network capability is not a particularly nice solution, but 3GPP is investigating whether an eNodeB can broadcast, in an LTE cell, the capability to perform LTE-NR dual connectivity. This use case is related to service indication, like the High-Speed Packet Access (HSPA) indicator in UTRA, but it can be used as an indication showing network capability. The network must then be prepared to receive MSG5 both on LTE-PDCP and on NR-PDCP.

In some embodiments, MSG1 or MSG3 resource allocation is different compared to legacy UEs. This will result in duplicate resource allocation for a UE, assuming it will pick one of these allocated resources based on its PDCP capability. In other words, the communications device is configured to receive an indication of a first set of communications resources from one of the infrastructure equipment and to receive an indication of a second set of communications resources from the infrastructure equipment, and to transmit signals comprising data to the infrastructure equipment in the first set of communications resources if the communications device is capable of operating in accordance with the PDCP in accordance with the first radio access technology and to transmit signals comprising data to the infrastructure equipment in the second set of communications resources if the communications device is not capable of operating in accordance with the PDCP in accordance with the first radio access technology.

In such embodiments described above, the UE behaviour for MSG5 is largely the same, i.e. the UE will use NR-PDCP for MSG5 if it is capable of doing so, and has successfully decoded MSG4 or the broadcast or any other alternative in which the network indicated its own capability of using NR-PDCP. RRC MSG5 will include the UE's capability or support for NR-PDCP, and the network may decode MSG5 using either NR-PDCP or LTE-PDCP because the HFN part (which as described above is the main difference between NR-PDCP and LTE-PDCP) may not be necessary to receive MSG5 in NR-PDCP and so therefore the operation of NR-PDCP is essentially the same as for LTE-PDCP in terms of MSG5 reception. HFN desynchronization is not a problem when PDCP SN has just been initialised. On reception of this message and a new IE, the network will change the configuration of PDCP, if required. The changes to MSG5 are shown in FIG. 6.

As described above, in some embodiments, the indication transmitted in the second message is comprised within an RRC IE of the second message. However, alternatively, embodiments of the present technique may use a new bit in the PDCP header to indicate that the NR-PDCP protocol has been used. This will avoid reconfiguration on the network side as described above. For this purpose, the reserved (R) bit can be used. The LTE-PDCP layer does not look into the R bit, and it always assumed to be set to "0". If the UE supports NR-PDCP then, in one of the embodiments, the R bit in NR-PDCP header is set to "1".

Figure 7:
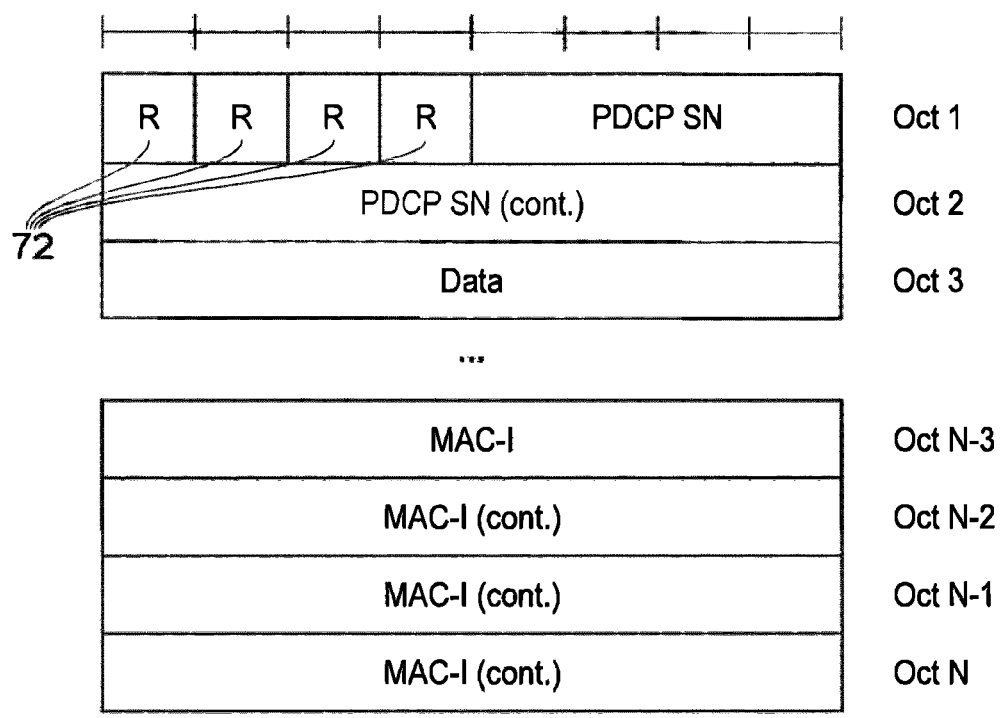
FIG. 7 illustrates the format of the PDCP Data Protocol Data Unit (PDU) for SRBs.

FIG. 7 illustrates the format of the PDCP Data Protocol Data Unit (PDU), with 12 bits PDCP SN, which is applicable for SRBs. Here, the R bits 72 can be seen, and in LTE-PDCP as described above, is set to "0" and these reserved bits will be ignored by the receiver. The intention is the second bit is used instead of the first bit in order to avoid confusion with the DRB PDU. So, the network side PDCP, while receiving MSG5, will need to check if the R bit has been set to "1" and then decide on that basis which PDCP entity to choose. There could be a layer sandwiched between the RLC and PDCP layers on the network side which checks only the setting of the R bit field in the PDCP header by the UE. In these embodiments, the network always allocates NR-PDCP to the UE. If the R bit is set to "0" then NR-PDCP sets up LTE-PDCP for the UE. This may be done via RRC or via control software on the eNodeB side.

In other words, the indication transmitted in the second message is comprised within a PDCP header of the second message.

Alternatively still, a new bit in the RLC header may be used, and if the NR-PDCP resides in a different location then the RLC layer needs to route the PDCP PDU to the correct PDCP entity. In other words the indication transmitted in the second message may be comprised within a Radio Link Control (RLC) header of the second message. Further, it may be that the indication transmitted in the second message is comprised within a Medium Access Control (MAC) header of the second message.

Two MSG3 sizes have been agreed in 3GPP, and RA partitioning corresponding to each MSG3 size for NR is needed. According to some embodiments of the present technique, one of the MSG3 sizes is linked to the support of NR-PDCP and is based on RA partition. This is related to the embodiment described above in which a new bit in the RLC header is used to indicate whether or not the network is capable of using NR-PDCP. In some further embodiments, one of the MSG3 sizes being linked to the support of NR-PDCP may be used in conjunction with the new bit in the RLC header indicating whether or not the network is capable of using NR-PDCP.

In further embodiments of the present technique, a preamble is assigned for initial access of UEs capable of using NR-PDCP for SRB1, so that the network is aware of the UE's capability. In other words, the communications device is configured to determine that the communications device should transmit data to the wireless communications network, and to transmit an initial access signal to one of the infrastructure equipment, wherein a preamble of the initial access signal comprises an indication that the communications device is capable of operating in accordance with one or both of the PDCP in accordance with the first radio access technology and the PDCP in accordance with the second radio access technology.

Figure 8:
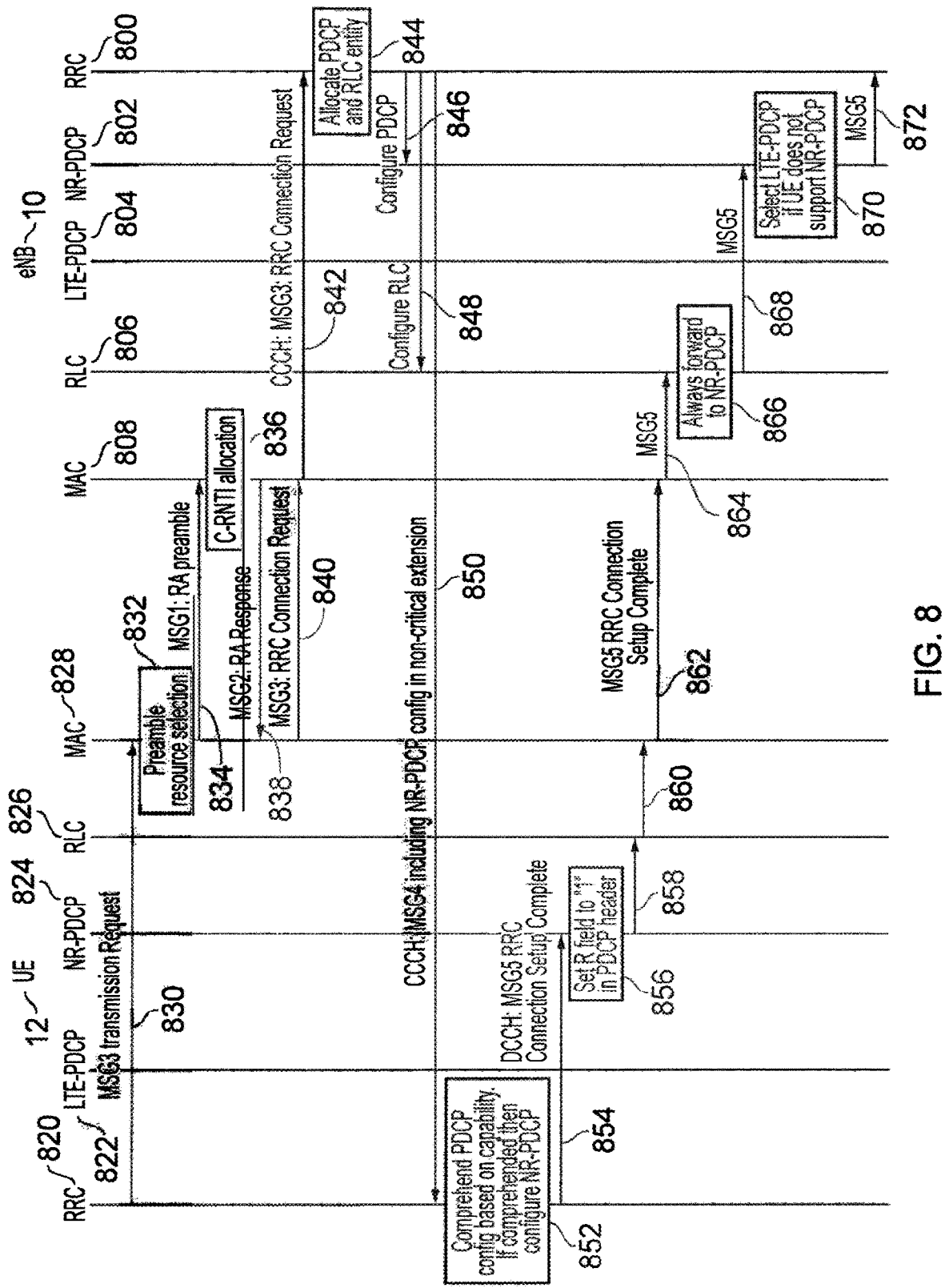
FIG. 8 is a third example of a message flow diagram of an example of message exchange between a communications device and an infrastructure equipment in accordance with embodiments of the present technique.

FIG. 8 shows an overview of the present technique, encompassing at least some of the embodiments of the present technique as described above, implemented in a communications system comprising a communications device (UE) 12 and an infrastructure equipment (eNodeB) 10. Each of the UE 12 and the eNB 10 comprise an RRC layer 820, 800, an LTE-PDCP layer 822, 802, an NR-PDCP layer 824, 804, an RLC layer 826, 806 and a MAC layer 828, 808. A MSG3 transmission request 830 is transmitted from the RRC layer 820 to the MAC layer 828 of the UE 12. In response, a preamble resource selection 832 is carried out at the MAC layer 828, and transmitted to the MAC layer 808 of the eNB 10 as part of MSG1 of a random access procedure. Based on this, a Cell Radio Network Temporary Identifier (C-RNTI) 836 is allocated by the MAC layer 808 of the eNB 10 and this is transmitted to the MAC layer 828 of the UE 12 as part of MSG2 838. The MAC layer 828 of the UE 12 then transmits MSG3 840 to the MAC layer 808 of the eNB 10, and this is forwarded 842 to the RRC layer 800 of the eNB 10, where PDCP and RLC entities are allocated 844. The RRC layer 800 of the eNB 10 then configures both the PDCP 846 and RLC 848 entities on the basis of this, and transmits MSG4 850 to the RRC layer 820 of the UE 12, which includes the NR-PDCP configuration in Non-Critical Extension. At the UE's 12 RRC layer 820, an attempt is made to comprehend the PDCP configuration 852 based on the capability of the UE 12. If comprehended, then the UE configures the NR-PDCP entity. To do so, the RRC layer 820 of the UE 12 transmits a dedicated control channel (DCCH) 854 to the NR-PDCP layer 824 comprising MSG5. At the NR-PDCP layer 824, the reserved (R) field may be set to "1" 856 in the PDCP header, and MSG5 is then forwarded 858 to the RLC layer 826 and forwarded again 860 to the MAC layer 828, where it is transmitted 862 to the MAC layer 808 of the eNB 10. The MAC layer 808 then forwards MSG5 864 to the RLC layer 806, and regardless of its composition (i.e. in relation to any indication of the UE's support of NR-PDCP), this is forwarded 866, 868 to the NR-PDCP layer 802 of the eNB 10. At the NR-PDCP layer 802, it may the case that LTE-PDCP is selected if the UE does not support NR-PDCP 870, but in any case, MSG5 is finally forwarded 872 to the RRC layer 800 of the eNB 10.

Figure 9:
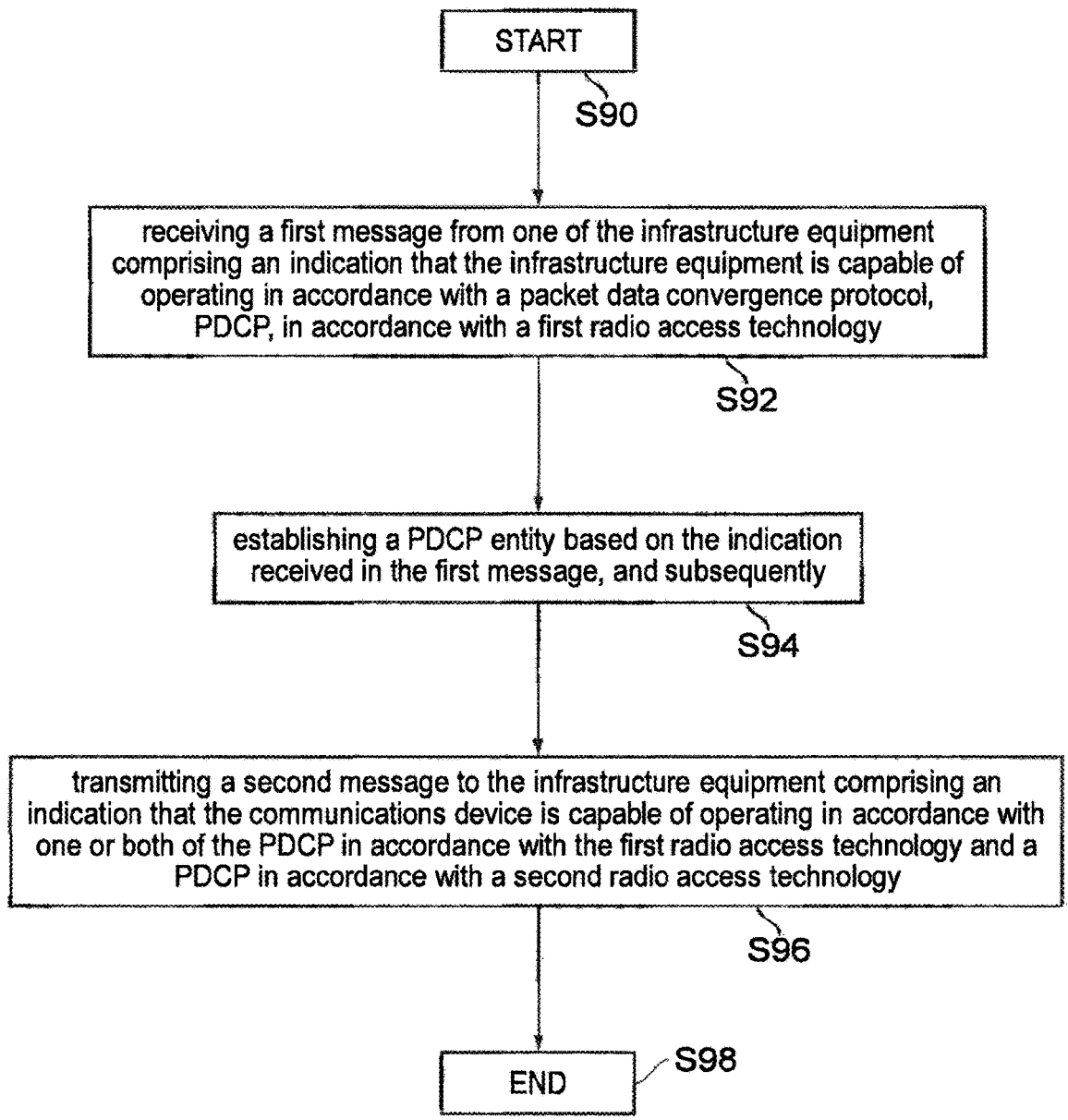
FIG. 9 shows a first flow diagram illustrating a process of communications in a communications system in accordance with embodiments of the present technique.

FIG. 9 shows a first flow diagram illustrating a process of communications in a communications system in accordance with embodiments of the present technique. The method, which is a method of operating a communications device configured to transmit or receive signals via a wireless access interface provided by a wireless communications network to or from one or more infrastructure equipment forming part of the wireless communications network, begins in step S90. The method comprises, at the time of a Radio Resource Control, RRC, connection establishment procedure, in step S92, receiving a first message from one of the infrastructure equipment comprising an indication that the infrastructure equipment is capable of operating in accordance with a packet data convergence protocol, PDCP, in accordance with a first radio access technology. In step S94, the method comprises establishing a PDCP entity based on the indication received in the first message, and subsequently in step S96, transmitting a second message to the infrastructure equipment comprising an indication that the communications device is capable of operating in accordance with one or both of the PDCP in accordance with the first radio access technology and a PDCP in accordance with a second radio access technology. The process ends in step S98.

Figure 10:
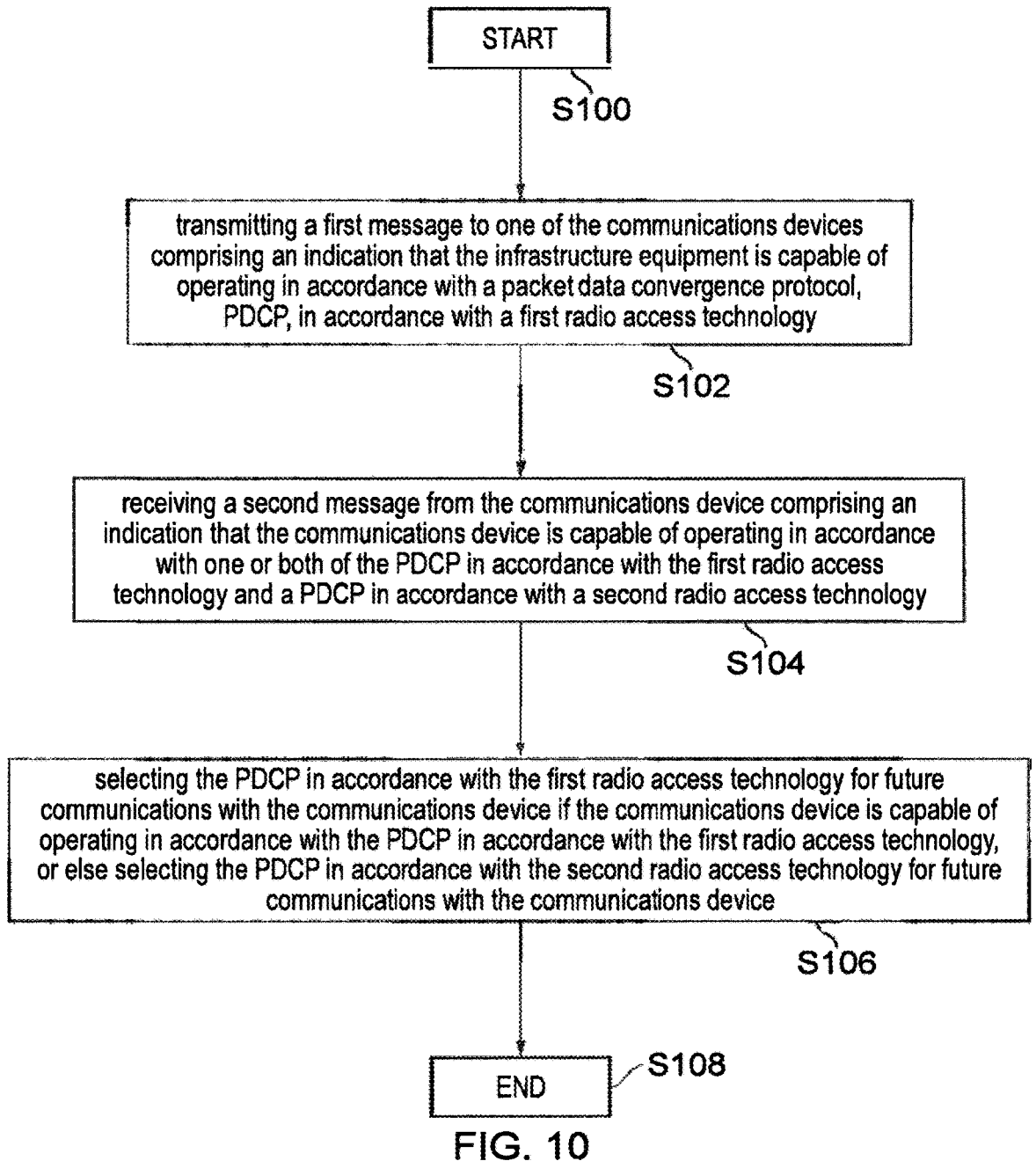
FIG. 10 shows a second flow diagram illustrating a process of communications in a communications system in accordance with embodiments of the present technique.

FIG. 10 shows a second flow diagram illustrating a process of communications in a communications system in accordance with embodiments of the present technique. The method, which is a method of operating an infrastructure equipment forming part of a wireless communications network configured to transmit or receive signals via a wireless access interface provided by the wireless communications network to or from one or more communications devices, begins in step S100. The method comprises, at the time of a Radio Resource Control, RRC, connection establishment procedure, in step S102, transmitting a first message to one of the communications devices comprising an indication that the infrastructure equipment is capable of operating in accordance with a packet data convergence protocol, PDCP, in accordance with a first radio access technology. In step S104, the method comprises receiving a second message from the communications device comprising an indication that the communications device is capable of operating in accordance with one or both of the PDCP in accordance with the first radio access technology and a PDCP in accordance with a second radio access technology, and in step S106, selecting the PDCP in accordance with the first radio access technology for future communications with the communications device if the communications device is capable of operating in accordance with the PDCP in accordance with the first radio access technology, or else selecting the PDCP in accordance with the second radio access technology for future communications with the communications device. The process ends in step S98.

As described above, embodiments of the present technique allow for the configuration of NR-PDCP for master cell group (MCG) signalling radio bearers (SRBs), where the communications devices may be either NR devices supporting LTE-NR dual connectivity or legacy devices.

Embodiments of the present technique also relate to infrastructure equipment and communications systems as described in the preceding paragraphs in relation to communications devices, along with methods of operating and circuitry for the same. Those skilled in the art would appreciate that such infrastructure equipment and/or communications systems may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A communications device configured to transmit or receive signals via a wireless access interface provided by a wireless communications network to or from one or more infrastructure equipment forming part of the wireless communications network, wherein the communications device is configured, at the time of a Radio Resource Control, RRC, connection establishment procedure,
- to receive a first message from one of the infrastructure equipment comprising an indication that the infrastructure equipment is capable of operating in accordance with a packet data convergence protocol, PDCP, in accordance with a first radio access technology,
- to establish a PDCP entity based on the indication received in the first message, and subsequently
- to transmit a second message to the infrastructure equipment comprising an indication that the communications device is capable of operating in accordance with one or both of the PDCP in accordance with the first radio access technology and a PDCP in accordance with a second radio access technology.

Paragraph 2. A communications device according to Paragraph 1, wherein the second message is transmitted by the communications device using the established PDCP entity.

Paragraph 3. A communications device according to Paragraph 1 or Paragraph 2, wherein the indication transmitted in the second message is comprised within an RRC Information Element, IE, of the second message.

Paragraph 4. A communications device according to Paragraph 1 or Paragraph 2, wherein the indication transmitted in the second message is comprised within a PDCP header of the second message.

Paragraph 5. A communications device according to Paragraph 1 or Paragraph 2, wherein the indication transmitted in the second message is comprised within a Radio Link Control, RLC, header of the second message.

Paragraph 6. A communications device according to Paragraph 1 or Paragraph 2, wherein the indication transmitted in the second message is comprised within a Medium Access Control, MAC, header of the second message.

Paragraph 7. A communications device according to any of Paragraphs 1 to 6, wherein the first message is received from the infrastructure equipment as a broadcast.

Paragraph 8. A communications device according to any of Paragraphs 1 to 6, wherein the first message forms part of a random access procedure between the communications device and the infrastructure equipment.

Paragraph 9. A communications device according to any of Paragraphs 1 to 8, configured
- to receive an indication of a first set of communications resources from one of the infrastructure equipment and to receive an indication of a second set of communications resources from the infrastructure equipment, and
- to transmit signals comprising data to the infrastructure equipment in the first set of communications resources if the communications device is capable of operating in accordance with the PDCP in accordance with the first radio access technology and to transmit signals comprising data to the infrastructure equipment in the second set of communications resources if the communications device is not capable of operating in accordance with the PDCP in accordance with the first radio access technology.

Paragraph 10. A communications device according to any of Paragraphs 1 to 9, wherein the communications device is configured to determine that the communications device should transmit data to the wireless communications network, and
- to transmit an initial access signal to one of the infrastructure equipment, wherein a preamble of the initial access signal comprises an indication that the communications device is capable of operating in accordance with one or both of the PDCP in accordance with the first radio access technology and the PDCP in accordance with the second radio access technology.

Paragraph 11. A communications device according to any of Paragraphs 1 to 10, wherein the first radio access technology is New Radio, NR.

Paragraph 12. A communications device according to any of Paragraphs 1 to 11, wherein the second radio access technology is Long Term Evolution, LTE.

Paragraph 13. An infrastructure equipment forming part of a wireless communications network configured to transmit or receive signals via a wireless access interface provided by the wireless communications network to or from one or more communications devices, wherein the infrastructure equipment is configured, at the time of a Radio Resource Control, RRC, connection establishment procedure,
- to transmit a first message to one of the communications devices comprising an indication that the infrastructure equipment is capable of operating in accordance with a packet data convergence protocol, PDCP, in accordance with a first radio access technology,
- to receive a second message from the communications device comprising an indication that the communications device is capable of operating in accordance with one or both of the PDCP in accordance with the first radio access technology and a PDCP in accordance with a second radio access technology, and
- to select the PDCP in accordance with the first radio access technology for future communications with the communications device if the communications device is capable of operating in accordance with the PDCP in accordance with the first radio access technology, or else to select the PDCP in accordance with the second radio access technology for future communications with the communications device.

Paragraph 14. An infrastructure equipment according to Paragraph 13, wherein the indication received in the second message is comprised within a Radio Resource Control Information Element, RRC IE, of the second message.

Paragraph 15. An infrastructure equipment according to Paragraph 13, wherein the indication received in the second message is comprised within a PDCP header of the second message.

Paragraph 16. An infrastructure equipment according to Paragraph 13, wherein the indication received in the second message is comprised within a Radio Link Control, RLC, header of the second message.

Paragraph 17. An infrastructure equipment according to Paragraph 13, wherein the indication received in the second message is comprised within a Medium Access Control, MAC, header of the second message.

Paragraph 18. An infrastructure equipment according to any of Paragraphs 13 to 17, wherein the infrastructure equipment is configured to transmit the first message as a broadcast.

Paragraph 19. An infrastructure equipment according to any of Paragraphs 13 to 17, wherein the first message forms part of a random access procedure between the communications device and the infrastructure equipment.

Paragraph 20. An infrastructure equipment according to any of Paragraphs 13 to 19, configured
- to transmit an indication of a first set of communications Paragraphs to one of the communications devices and to transmit an indication of a second set of communications resources to the communications device, and to receive signals comprising data from the communications device in the first set of communications resources if the communications device is capable of operating in accordance with the PDCP in accordance with the first radio access technology and to receive signals comprising data from the communications device in the second set of communications resources if the communications device is not capable of operating in accordance with the PDCP in accordance with the first radio access technology.

Paragraph 21. A communications system, comprising one or more infrastructure equipment forming part of a wireless communications network, and a communications device configured to transmit or receive signals via a wireless access interface provided by the wireless communications network to or from the one or more infrastructure equipment, wherein the communications device is configured, at the time of a Radio Resource Control, RRC, connection establishment procedure, to receive a first message from one of the infrastructure equipment comprising an indication that the infrastructure equipment is capable of operating in accordance with a packet data convergence protocol, PDCP, in accordance with a first radio access technology, to establish a PDCP entity based on the indication received in the first message, and subsequently to transmit a second message to the infrastructure equipment comprising an indication that the communications device is capable of operating in accordance with one or both of the PDCP in accordance with the first radio access technology and a PDCP in accordance with a second radio access technology.

Paragraph 22. A method of operating a communications device configured to transmit or receive signals via a wireless access interface provided by a wireless communications network to or from one or more infrastructure equipment forming part of the wireless communications network, wherein the method comprises, at the time of a Radio Resource Control, RRC, connection establishment procedure, receiving a first message from one of the infrastructure equipment comprising an indication that the infrastructure equipment is capable of operating in accordance with a packet data convergence protocol, PDCP, in accordance with a first radio access technology, establishing a PDCP entity based on the indication received in the first message, and subsequently transmitting a second message to the infrastructure equipment comprising an indication that the communications device is capable of operating in accordance with one or both of the PDCP in accordance with the first radio access technology and a PDCP in accordance with a second radio access technology.

Paragraph 23. A method of operating an infrastructure equipment forming part of a wireless communications network configured to transmit or receive signals via a wireless access interface provided by the wireless communications network to or from one or more communications devices, wherein the method comprises, at the time of a Radio Resource Control, RRC, connection establishment procedure, transmitting a first message to one of the communications devices comprising an indication that the infrastructure equipment is capable of operating in accordance with a packet data convergence protocol, PDCP, in accordance with a first radio access technology, receiving a second message from the communications device comprising an indication that the communications device is capable of operating in accordance with one or both of the PDCP in accordance with the first radio access technology and a PDCP in accordance with a second radio access technology, and selecting the PDCP in accordance with the first radio access technology for future communications with the communications device if the communications device is capable of operating in accordance with the PDCP in accordance with the first radio access technology, or else selecting the PDCP in accordance with the second radio access technology for future communications with the communications device.

Paragraph 24. A method of operating a communications system, comprising one or more infrastructure equipment forming part of a wireless communications network, and a communications device configured to transmit or receive signals via a wireless access interface provided by the wireless communications network to or from the one or more infrastructure equipment, wherein the method comprises, at the time of a Radio Resource Control, RRC, connection establishment procedure, to receive a first message from one of the infrastructure equipment comprising an indication that the infrastructure equipment is capable of operating in accordance with a packet data convergence protocol, PDCP, in accordance with a first radio access technology, to establish a PDCP entity based on the indication received in the first message, and subsequently to transmit a second message to the infrastructure equipment comprising an indication that the communications device is capable of operating in accordance with one or both of the PDCP in accordance with the first radio access technology and a PDCP in accordance with a second radio access technology.

Paragraph 25. Circuitry for a communications device configured to transmit or receive signals via a wireless access interface provided by a wireless communications network to or from one or more infrastructure equipment forming part of the wireless communications network, wherein the communications device is configured, at the time of a Radio Resource Control, RRC, connection establishment procedure, receiving a first message from one of the infrastructure equipment comprising an indication that the infrastructure equipment is capable of operating in accordance with a packet data convergence protocol, PDCP, in accordance with a first radio access technology, establishing a PDCP entity based on the indication received in the first message, and subsequently transmitting a second message to the infrastructure equipment comprising an indication that the communications device is capable of operating in accordance with one or both of the PDCP in accordance with the first radio access technology and a PDCP in accordance with a second radio access technology.

Paragraph 26. Circuitry for an infrastructure equipment forming part of a wireless communications network configured to transmit or receive signals via a wireless access interface provided by the wireless communications network to or from one or more communications devices, wherein the infrastructure equipment is configured, at the time of a Radio Resource Control, RRC, connection establishment procedure,
    to transmit a first message to one of the communications devices comprising an indication that the infrastructure equipment is capable of operating in accordance with a packet data convergence protocol, PDCP, in accordance with a first radio access technology,
    to receive a second message from the communications device comprising an indication that the communications device is capable of operating in accordance with one or both of the PDCP in accordance with the first radio access technology and a PDCP in accordance with a second radio access technology, and
    to select the PDCP in accordance with the first radio access technology for future communications with the communications device if the communications device is capable of operating in accordance with the PDCP in accordance with the first radio access technology, or else to select the PDCP in accordance with the second radio access technology for future communications with the communications device.

Paragraph 27. Circuitry for a communications system, comprising
    one or more infrastructure equipment forming part of a wireless communications network, and
    a communications device configured to transmit or receive signals via a wireless access interface provided by the wireless communications network to or from the one or more infrastructure equipment,
    wherein the communications device is configured, at the time of a Radio Resource Control, RRC, connection establishment procedure,
    to receive a first message from one of the infrastructure equipment comprising an indication that the infrastructure equipment is capable of operating in accordance with a packet data convergence protocol, PDCP, in accordance with a first radio access technology,
    to establish a PDCP entity based on the indication received in the first message, and subsequently to transmit a second message to the infrastructure equipment comprising an indication that the communications device is capable of operating in accordance with one or both of the PDCP in accordance with the first radio access technology and a PDCP in accordance with a second radio access technology.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-160671, "New SID Proposal: Study on New Radio Access Technology," NTT DOCOMO, RAN #71.
[2] LTE for UMTS: OF-DMA and SC-FDMA Based Radio Access, Harris Holma and Antti Toskala, Wiley 2009, ISBN 978-0-470-99401-6.
[3] 3GPP TS 36.323, "Evolved Universal Terrestrial Radio Access (E-UTRA); Packet Data Convergence Protocol (PDCP) specification," $3^{rd}$ Generation Partnership Project.
[4] R2-1707487, "Offline discussion #3 on harmonized bearer type," Intel Corporation, Qingdao, China.

What is claimed is:

1. Circuitry for a communications device configured to transmit or receive signals via a wireless access interface provided by a wireless communications network to or from one or more infrastructure equipment forming part of the wireless communications network, wherein the circuitry is configured to:
    receive a first Radio Resource Control (RRC) message from one of the infrastructure equipment comprising an indication that the infrastructure equipment can operate in accordance with a packet data convergence protocol (PDCP) in accordance with a first radio access technology;
    establish a PDCP entity; and
    transmit a second RRC message to the infrastructure equipment comprising an indication that the communications device is capable of operating in accordance with one or both of the PDCP in accordance with the first radio access technology and a PDCP in accordance with a second radio access technology.

2. The circuitry of claim 1, wherein
    the circuitry is configured to transmit the second RRC message to the infrastructure equipment after establishing the PDCP entity.

3. The circuitry of claim 1, wherein
    the second RRC message is a message confirming successful completion of an RRC connection establishment procedure with the infrastructure equipment.

4. The circuitry of claim 1, wherein
    the second RRC message is transmitted by the communications device using the established PDCP entity.

5. The circuitry of claim 1, wherein
    the indication transmitted in the second RRC message is comprised within an RRC Information Element (IE) of the second RRC message.

6. The circuitry of claim 1, wherein
the indication transmitted in the second RRC message is comprised within a PDCP header of the second RRC message.

7. The circuitry of claim 1, wherein
the indication transmitted in the second RRC message is comprised within a Radio Link Control (RLC) header of the second message.

8. The circuitry of claim 1, wherein
the indication transmitted in the second RRC message is comprised within a Medium Access Control (MAC) header of the second message.

9. The circuitry of claim 1, wherein
the first RRC message is received from the infrastructure equipment as a broadcast.

10. The circuitry of claim 1, wherein
the first RRC message forms part of a random access procedure between the communications device and the infrastructure equipment.

11. The circuitry of claim 1, wherein the circuitry is configured to:
receive an indication of a first set of communications resources from one of the infrastructure equipment;
receive an indication of a second set of communications resources from the infrastructure equipment;
transmit signals comprising data to the infrastructure equipment in the first set of communications resources in a case that the communications device is capable of operating in accordance with the PDCP in accordance with the first radio access technology; and
transmit signals comprising data to the infrastructure equipment in the second set of communications resources in a case that the communications device is not capable of operating in accordance with the PDCP in accordance with the first radio access technology.

12. The circuitry of claim 1, wherein the circuitry is configured to:
determine that the communications device should transmit data to the wireless communications network; and
transmit an initial access signal to one of the infrastructure equipment, wherein a preamble of the initial access signal comprises an indication that the communications device is capable of operating in accordance with one or both of the PDCP in accordance with the first radio access technology and the PDCP in accordance with the second radio access technology.

13. Circuitry for an infrastructure equipment forming part of a wireless communications network configured to transmit or receive signals via a wireless access interface provided by the wireless communications network to or from one or more communications devices, wherein the circuitry is configured to:
transmit a first Radio Resource Control (RRC) message to one of the communications devices comprising an indication that the infrastructure equipment is capable of operating in accordance with a packet data convergence protocol (PDCP) in accordance with a first radio access technology;
receive a second RRC message from the communications device comprising an indication that the communications device is capable of operating in accordance with one or both of the PDCP in accordance with the first radio access technology and a PDCP in accordance with a second radio access technology; and
select the PDCP in accordance with the first radio access technology for communications with the communications device in a case that the communications device is capable of operating in accordance with the PDCP in accordance with the first radio access technology, or else to select the PDCP in accordance with the second radio access technology for future communications with the communications device.

14. The circuitry of claim 13, wherein
the indication received in the second RRC message is comprised within an RRC Information Element (IE) of the second RRC message.

15. The circuitry of claim 13, wherein
the indication received in the second RRC message is comprised within a PDCP header of the second RRC message.

16. The circuitry of claim 13, wherein
the indication received in the second RRC message is comprised within a Radio Link Control (RLC) header of the second message.

17. The circuitry of claim 13, wherein
the indication received in the second RRC message is comprised within a Medium Access Control (MAC) header of the second message.

18. The circuitry of claim 13, wherein
the infrastructure equipment is configured to transmit the first RRC message as a broadcast.

19. The circuitry of claim 13, wherein the circuitry is configured to:
transmit an indication of a first set of communications resources to one of the communications devices;
transmit an indication of a second set of communications resources to the communications device;
receive signals comprising data from the communications device in the first set of communications resources in a case that the communications device is capable of operating in accordance with the PDCP in accordance with the first radio access technology; and
receive signals comprising data from the communications device in the second set of communications resources in a case that the communications device is not capable of operating in accordance with the PDCP in accordance with the first radio access technology.

20. A method performed by an infrastructure equipment forming part of a wireless communications network configured to transmit or receive signals via a wireless access interface provided by the wireless communications network to or from one or more communications devices, the method comprising:
transmitting a first Radio Resource Control (RRC) message to one of the communications devices comprising an indication that the infrastructure equipment is capable of operating in accordance with a packet data convergence protocol (PDCP) in accordance with a first radio access technology;
receiving a second RRC message from the communications device comprising an indication that the communications device is capable of operating in accordance with one or both of the PDCP in accordance with the first radio access technology and a PDCP in accordance with a second radio access technology; and
selecting the PDCP in accordance with the first radio access technology for communications with the communications device in a case that the communications device is capable of operating in accordance with the PDCP in accordance with the first radio access technology, or else to select the PDCP in accordance with the second radio access technology for future communications with the communications device.

\* \* \* \* \*